(12) United States Patent
Wessels et al.

(10) Patent No.: US 6,219,606 B1
(45) Date of Patent: Apr. 17, 2001

(54) RESTRAINT DEPLOYMENT CONTROL METHOD HAVING A DELAYED ADAPTABLE DEPLOYMENT THRESHOLD

(75) Inventors: Gerhard F. Wessels, Haan (DE); Joseph Thomas Dalum, Noblesville, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/192,523

(22) Filed: Nov. 16, 1998

(51) Int. Cl.$^7$ ..................................................... B60R 21/14
(52) U.S. Cl. ............................ 701/45; 701/46; 280/731; 280/732; 180/271; 180/282
(58) Field of Search ....................... 701/45, 46; 280/731, 280/732, 728.1; 180/271, 282

(56) References Cited

U.S. PATENT DOCUMENTS

| | | | |
|---|---|---|---|
| Re. 36,122 | * 3/1999 | Mattes et al. | 180/268 |
| 5,014,810 | * 5/1991 | Mattes et al. | 180/268 |
| 5,538,099 | * 7/1996 | Blackburn et al. | 180/282 |
| 5,608,628 | * 3/1997 | Dresler et al. | 364/424.055 |
| 5,964,817 | * 10/1999 | Dalum et al. | 701/45 |
| 5,969,599 | * 10/1999 | Wessels et al. | 340/436 |
| 5,999,871 | * 12/1999 | Liu | 701/45 |

* cited by examiner

Primary Examiner—William A. Cuchlinski, Jr.
Assistant Examiner—Marthe Marc-Coleman
(74) Attorney, Agent, or Firm—Jimmy L. Funke

(57) ABSTRACT

An improved deployment control method for a vehicular supplemental restraint system, wherein a deployment threshold is initially established at a predefined level, threshold adjustments are periodically determined in the course of the crash event based on one or more secondary measures of crash severity, and wherein the adjustments are applied to the deployment threshold at a time determined in relation to a predefined level of crash progression. In other words, deployment threshold adjustments are periodically determined based on identified characteristics of the crash signal and accumulated to form a net adjustment value, and the net adjustment value is not put into effect for purposes of deploying the restraints until expiration of a delay time initiated at a predefined level of crash progression. In a preferred implementation of the invention, the net adjustment value is put into effect for purposes of deploying the restraints prior to expiration of the delay time if certain secondary measures indicate that the crash is especially severe.

9 Claims, 5 Drawing Sheets

RESTRAINT DEPLOYMENT CONTROL METHOD HAVING A DELAYED ADAPTABLE DEPLOYMENT THRESHOLD

TECHNICAL FIELD

This invention relates to automotive passenger restraint systems, and more particularly to a control method that differentiates deployment events from non-deployment events.

BACKGROUND OF THE INVENTION

In general, automotive passenger restraint systems perform a number of functions including acceleration sensing, signal processing and analysis, and deployment of one or more restraint devices such as frontal or side air bags and seat belt pretensioners in response to a sensed crash event. Typically, the acceleration signal is monitored to detect a potential crash event, and then filtered or integrated over the course of the crash event to produce a velocity change or $\Delta V$ signal. If the $\Delta V$ signal exceeds a threshold, the crash event is determined to be sufficiently severe to warrant deployment of restraints. The threshold is typically time-dependent, and is calibrated based on data logged for different types of crash events, as well as data logged during rough road driving.

A problem with the above-described approach is that it is often difficult to synchronize the time progression of the crash (that is, the event clock or timer) with the actual crash event. Various algorithms have been developed for determining if and when the event clock should be reset to improve synchronization. As a result, it can be difficult to distinguish between deployment events and non-deployment events, particularly in the initial portion of the sensed event.

SUMMARY OF THE PRESENT INVENTION

The present invention is directed to an improved deployment control method for a vehicular supplemental restraint system, wherein a deployment threshold is initially established at a predefined level, threshold adjustments are periodically determined in the course of the crash event based on one or more secondary measures of crash severity, and wherein the adjustments are applied to the deployment threshold at a time determined in relation to a predefined level of crash progression. In other words, deployment threshold adjustments are periodically determined based on identified characteristics of the crash signal and accumulated to form a net adjustment value, and the net adjustment value is not put into effect for purposes of deploying the restraints until expiration of a delay time initiated at a predefined level of crash progression. In a preferred implementation of the invention, the net adjustment value is put into effect for purposes of deploying the restraints prior to expiration of the delay time if certain secondary measures indicate that the crash is especially severe.

BRIEF DESCRIPTION OF THE DRAWINGS

FIG. 4 is a main flow diagram, FIG. 5 details a step of the main flow diagram relating to calculation of threshold adjustments, and FIG. 6 details a step of the main flow diagram relating to determining when the threshold adjustments should be applied to the threshold.

DETAILED DESCRIPTION OF THE DRAWINGS

Figure 1:
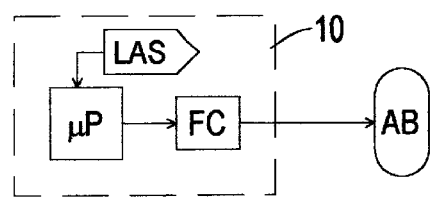
FIG. 1 is a schematic diagram of a supplemental restraint system including a programmed microprocessor for carrying out the deployment method of this invention.

FIG. 1 generally depicts a vehicle supplemental restraint system in which one or more restraints, such as air bags AB, are deployed in a severe crash event to protect the vehicle occupants. The restraints may include without limitation, air bags, belt pretensioners, inflatable tubular structures, side curtains, anti-whiplash devices, etc., and it will be understood that such term AB as used herein does not refer exclusively to a particular type of restraint. A deployment control system, designated generally by the reference numeral 10, may be packaged as a single electronic module and mounted on a frame element in a central portion of the vehicle. Fundamentally, the system 10 includes a longitudinal acceleration sensor LAS (which may comprise a single sensor or a pair of sensors mounted at an offset angle) for sensing longitudinal acceleration of the vehicle, a microprocessor $\mu P$ for receiving the output signal of longitudinal acceleration sensor LAS, and a firing circuit FC which is triggered by microprocessor $\mu P$ to deploy the air bags AB in the event of a severe crash. In general, the microprocessor $\mu P$ filters the longitudinal acceleration signal over a predefined interval, or window, to form a windowed velocity signal, referred to herein as $\Delta V_{WIN}$. The microprocessor $\mu P$ then adjusts a deployment threshold, referred to herein as a $\Delta V$ Threshold, based on event progression and secondary crash criteria, and compares $\Delta V_{WIN}$ to the $\Delta V$ Threshold. If $\Delta V_{WIN}$ crosses the $\Delta V$ Threshold, the microprocessor $\Delta P$ signals the firing circuit FC to deploy the air bags AB.

According to the present invention, the $\Delta V$ Threshold is set at a default level prior to initiation of a crash event and threshold adjustments are periodically determined and accumulated during the crash event, with the net adjustment value and subsequent adjustment values (if any) being put into effect for purposes of deploying the restraints upon expiration of a delay time initiated at a predefined level of event progression. Preferably, the event progression is determined by the value of a $\Delta$ velocity signal ($\Delta V_{bias}$) biased toward zero, and the threshold adjustments are determined based on secondary measures of crash severity and event progression. Additionally, in the preferred mechanization, the net adjustment value is applied to the deployment threshold prior to expiration of the delay time if certain secondary measures indicate that the crash is especially severe.

The windowed velocity signal $\Delta V_{WIN}$ may be calculated according to the expression:

$$\Delta V_{WIN}(n) = \Sigma[ACCEL(n-i)], \text{ for } i=0 \text{ to } (w-1) \qquad (1)$$

where ACCEL is a filtered version of the output of acceleration sensor LAS and w is the window size. In a digital implementation, the window w actually refers to a specified number of successive samples of the acceleration signal. Since the samples are read at a predefined rate, however, the window w also may be viewed as a corresponding time interval.

The biased velocity signal $\Delta V_{bias}$ may be determined by computing a filtered acceleration signal $\Delta V$, and then applying a bias "B". For example, $\Delta V$ may be calculated according to the expression:

$$\Delta V(n) = \Delta V(n-1) + ACCEL(n) - \Delta V(n-1)/C \quad (2)$$

where C is a constant, with $\Delta V_{bias}$ being defined as:

$$\Delta V_{bias} = \Delta V - B \quad (3)$$

and the bias B being defined as:

$$B = \begin{cases} d & \text{if } \Delta V > d, \text{ with } d \text{ being a positive integer} \\ \Delta V & \text{if } |\Delta V| \leq d \\ -d & \text{if } \Delta V < -d \end{cases} \quad (4)$$

Figure 2:
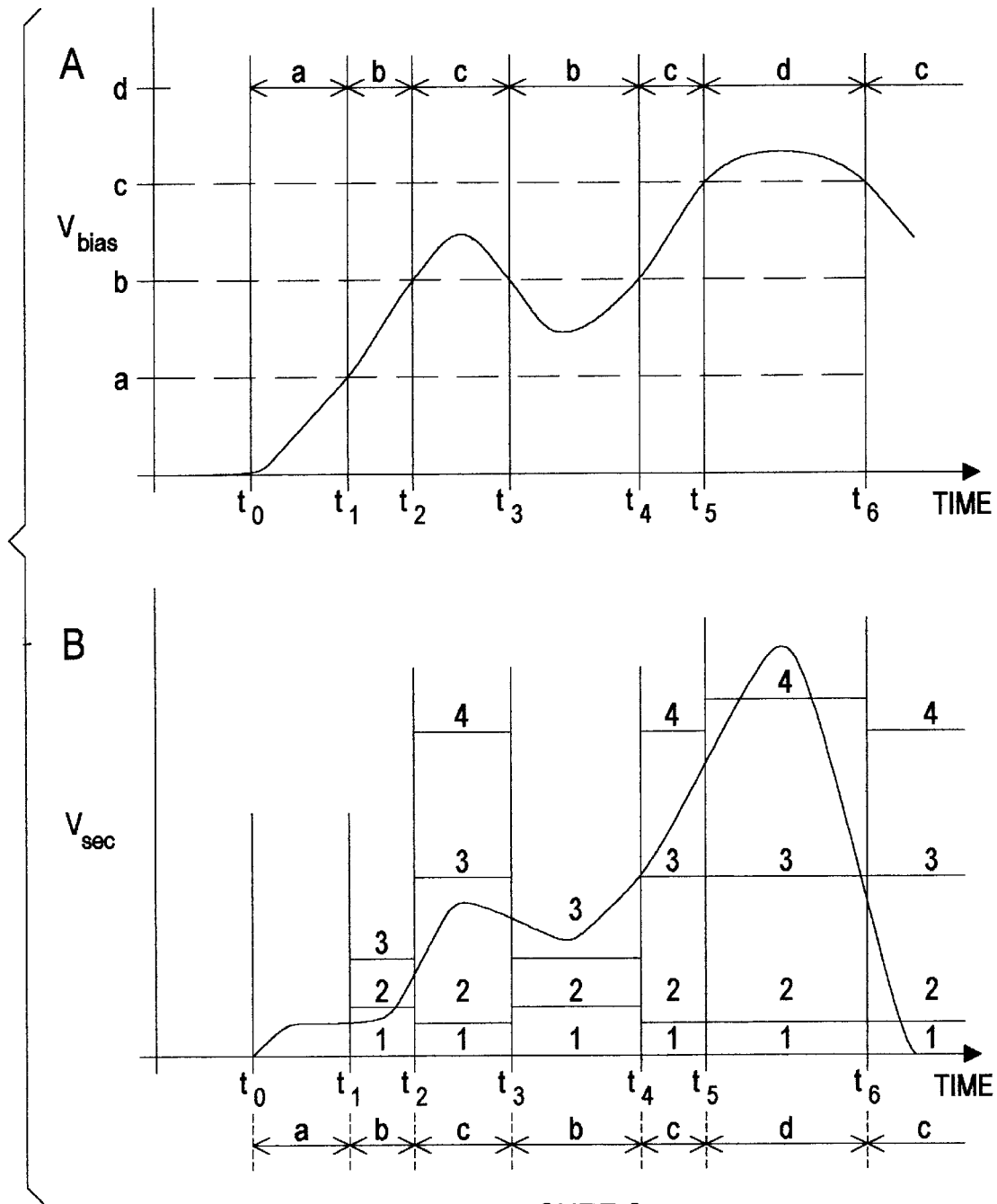
FIG. 2 is a graphical representation of event progression and threshold adjustment determination according to this invention.

Alternatively, the level of event progression can be determined by using windowed velocity $\Delta V_{WIN}$ within a limited acceleration range, or a filtered version of $\Delta V_{WIN}$ or $\Delta V$. For purposes of this description, however, it will be assumed that $\Delta V_{bias}$ is used to determine the level of event progression. To this end, $\Delta V_{bias}$ is compared to a series of predefined velocity values, referred to herein as progression level thresholds a–d, thereby defining four corresponding stages or levels of event progression; obviously, the number of thresholds, and hence progression levels, may vary from one implementation to another. The approach is graphically depicted in FIG. 2, where Graphs A and B show exemplary values of $\Delta V_{bias}$ and a secondary measurement term $\Delta V_{sec}$ respectively, on a common time scale. The time designations $t_0$–$t_6$ signify times that coincide with $\Delta V_{bias}$ crossing one of the thresholds a–d, and the event progression level at any given time is indicated at the top of Graph A, and below the time axis of Graph B. For example, progression level of the sensed event is "a" in the time interval $t_0$–$t_1$, "b" in the time interval $t_1$–$t_2$, "c" in the time interval $t_2$–$t_3$, "b" in the time interval $t_3$–$t_4$, and so on. The progression level "a" is indicative of no or very low activity. For each secondary measure $\Delta V_{sec}$, each of the progression levels a–d have predefined regions corresponding to different levels of the secondary measure, as shown by the vertical columns in Graph B, and the threshold adjustment amount is determined based on which region the secondary signal is in. For example, if the sensed event in is progression level "b", a set of threshold adjustment rules might be: (1) increase the $\Delta V$ Threshold by 5 counts if $\Delta V_{sec}$, is in region 1, (2) increase the $\Delta V$ Threshold by 1 counts if $\Delta V_{sec}$, is in region 2, and (3) decrease the $\Delta V$ Threshold by 2 counts if $\Delta V_{sec}$, is in region 3.

In any event, the various periodically determined threshold adjustments are summed or accumulated to form a net threshold adjustment, but the net threshold adjustment is not put into effect for purposes of deploying the restraints until the expiration of the delay time. Threshold adjustments determined after the expiration of the delay time are applied to the deployment threshold without delay. As indicated above, the delay time is initiated upon attainment of a predefined level of event progression, such as the transition from progression level "a" to progression level "b". And finally, in the preferred embodiment, the net adjustment value is applied to the deployment threshold prior to expiration of the delay time if certain secondary measures indicate that the crash is especially severe. For example, the net adjustment value is applied to the deployment threshold immediately if a crash oscillation measure exceeds a predefined level.

Figure 3:
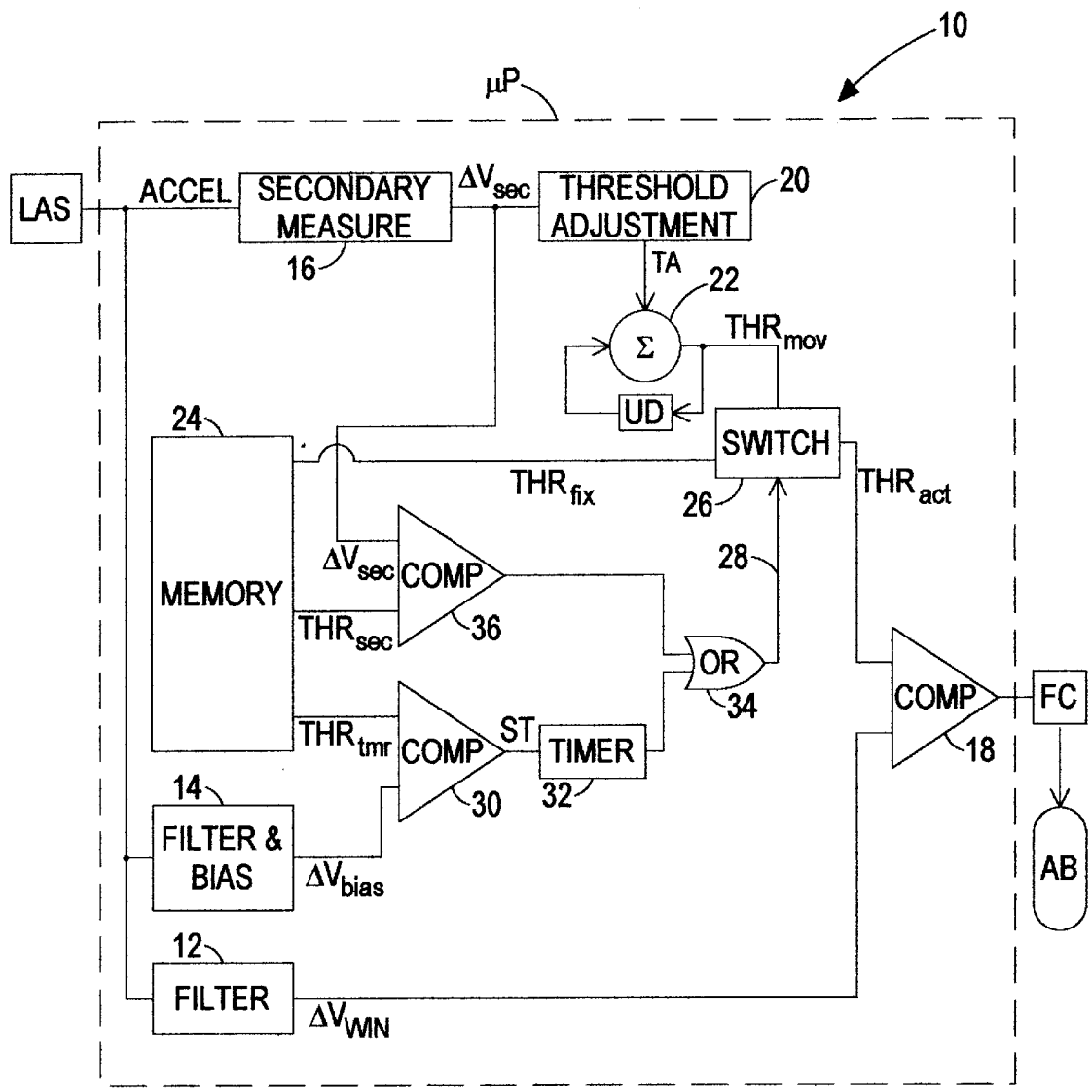
FIG. 3 is a logic diagram illustrating the operation of the deployment method of this invention.

FIG. 3 is a logic diagram of deployment control system 10, illustrating the operation of the microprocessor $\mu$P of FIG. 1 in carrying out the control of this invention. As indicated in reference to FIG. 1, the longitudinal acceleration sensor LAS produces an acceleration signal ACCEL, and the microprocessor $\mu$P analyzes the ACCEL signal, and commands the firing circuit FC to deploy the restraints AB if a sufficiently severe crash event is detected. The ACCEL signal is provided as an input to blocks 12, 14 and 16. Block 12 develops a primary measure of crash severity $\Delta V_{WIN}$ in accordance with equation (1), block 14 develops a biased velocity signal $\Delta V_{bias}$ in accordance with equations (2)–(4), and block 16 develops secondary measures of crash severity $\Delta V_{sec}$ such as a velocity gradient or a velocity oscillation signal. The primary measure $\Delta V_{WIN}$ is compared with the active deployment threshold (THR$_{act}$) at comparator 18, and if $\Delta V_{WIN}$ exceeds THR$_{act}$ the firing circuit FC is activated to deploy the restraints AB. The secondary measures $\Delta V_{sec}$ are supplied to block 20, which determines threshold adjustments $T_A$, as explained above in reference to FIG. 2, for example, and the threshold adjustments $T_A$ are summed with a current value of THR$_{mov}$ (as indicated by the Unit Delay block UD) to update THR$_{mov}$. During periods of inactivity, THR$_{mov}$ is progressively returned to an initial value THR$_{init}$. The fixed and initial thresholds THR$_{fix}$ and THR$_{init}$, along with secondary and timer threshold values THR$_{sec}$ and THR$_{tmr}$, are provided by the microprocessor memory 24. The fixed and moving thresholds THR$_{fix}$ and THR$_{mov}$ are supplied as inputs to a switch 26, which selects either THR$_{fix}$ or THR$_{mov}$ to be the active threshold THR$_{act}$, depending on the logic level applied to control line 28. Ordinarily, control line 28 is at a logic zero level, causing switch 26 to select THR$_{fix}$ as the active threshold THR$_{act}$. Under certain conditions, the components 30, 32, 34 and 36 cooperate to drive the control line 28 to a logic one level, causing switch 26 to select THR$_{mov}$ as the active threshold THR$_{act}$. The comparator 30 compares $\Delta V_{bias}$ to the timer threshold THR$_{tmr}$, which may be the same as the progression level threshold "b" described in reference to FIG. 2, for example. When $\Delta V_{bias}$ exceeds THR$_{tmr}$, the comparator 30 triggers timer 32 to measure a delay interval, but if $\Delta V_{bias}$ falls below THR$_{tmr}$, the timer 32 is reset. The output of timer 32 is provided as an input to OR-gate 34, so that control line 28 of switch 26 is driven to a logic one state upon expiration of the measured delay interval. The comparator 36 compares secondary measure $\Delta V_{sec}$ to the secondary threshold THR$_{sec}$, and similarly triggers OR-gate 34 to drive control line 28 to a logic one state if $\Delta V_{sec}$ exceeds THR$_{sec}$. Thus the active threshold THR$_{act}$ used to decide if the restraints AB should be deployed is determined according to THR$_{fix}$ until either $\Delta V_{sec}$ exceeds THR$_{sec}$, or $\Delta V_{bias}$ exceeds THR$_{tmr}$ for the delay time measured by timer 32. As explained above the timer threshold THR$_{tmr}$ corresponds to predetermined level of crash progression, and the secondary threshold THR$_{sec}$ corresponds to a secondary measure indicative of a very severe crash.

Figure 4:
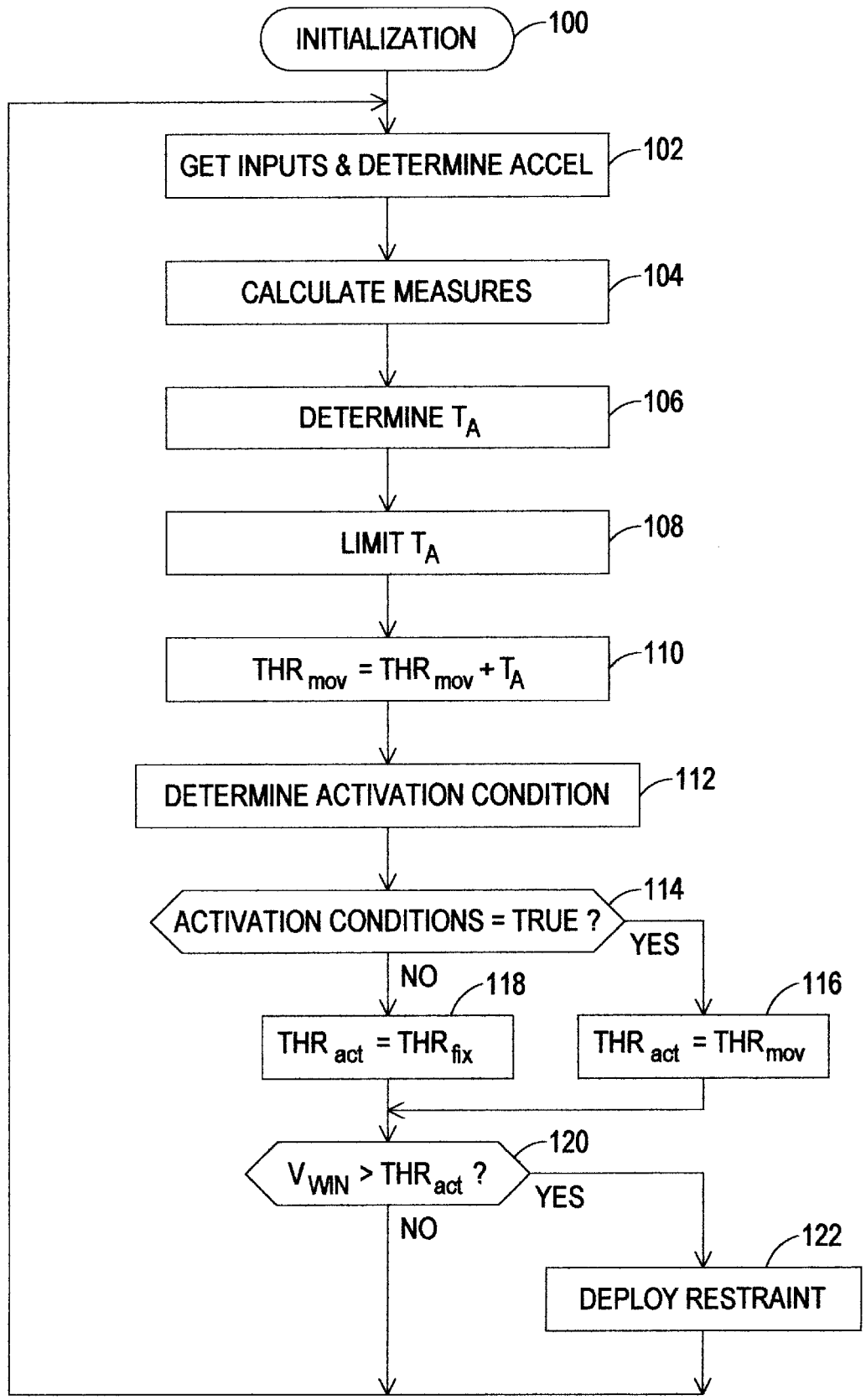
FIGS. 4-6 are flow diagrams representative of computer program instructions executed by the microprocessor of FIG. 1 in carrying out the deployment method of this invention.
Figure 5:
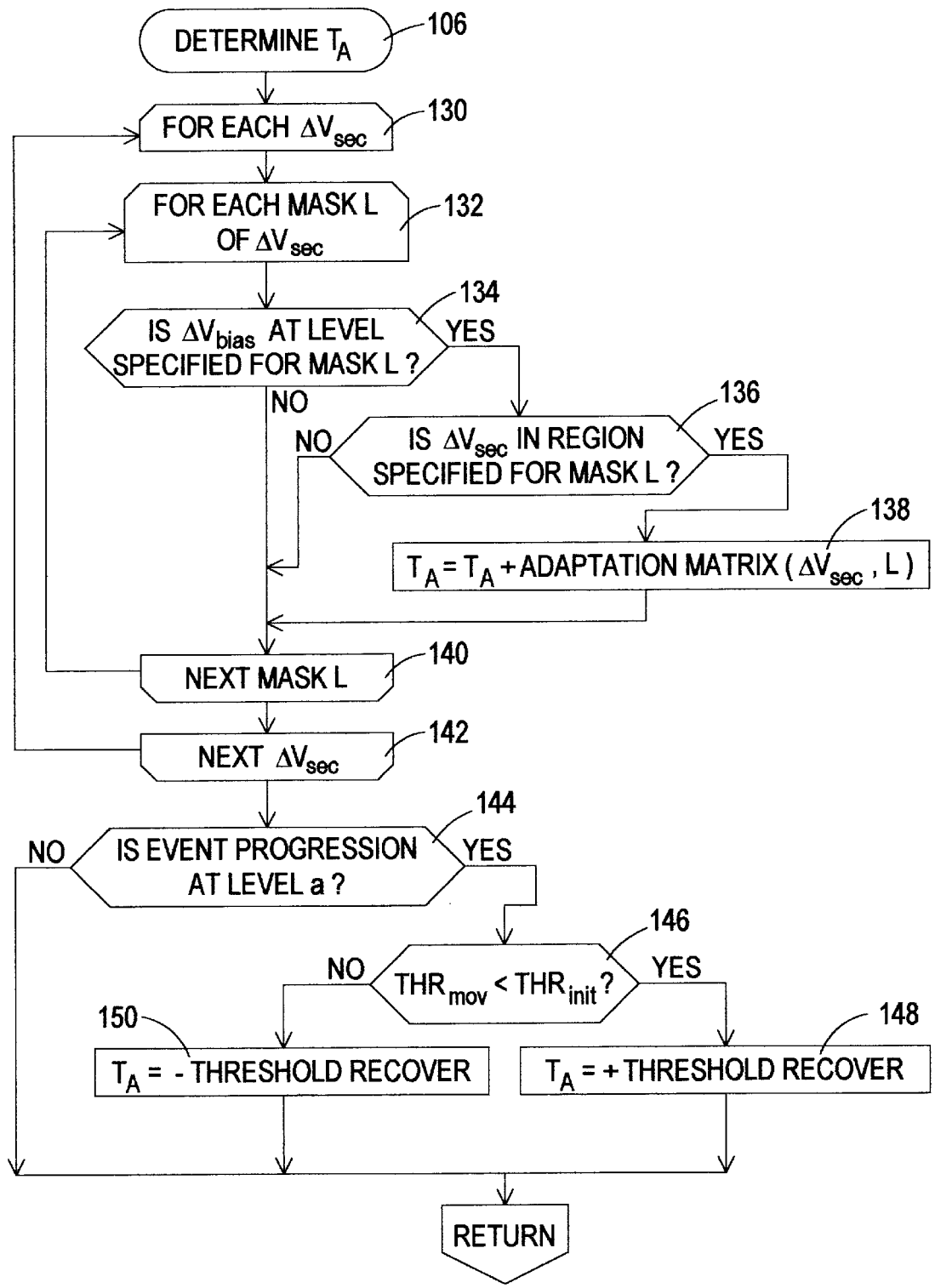
Figure 6:
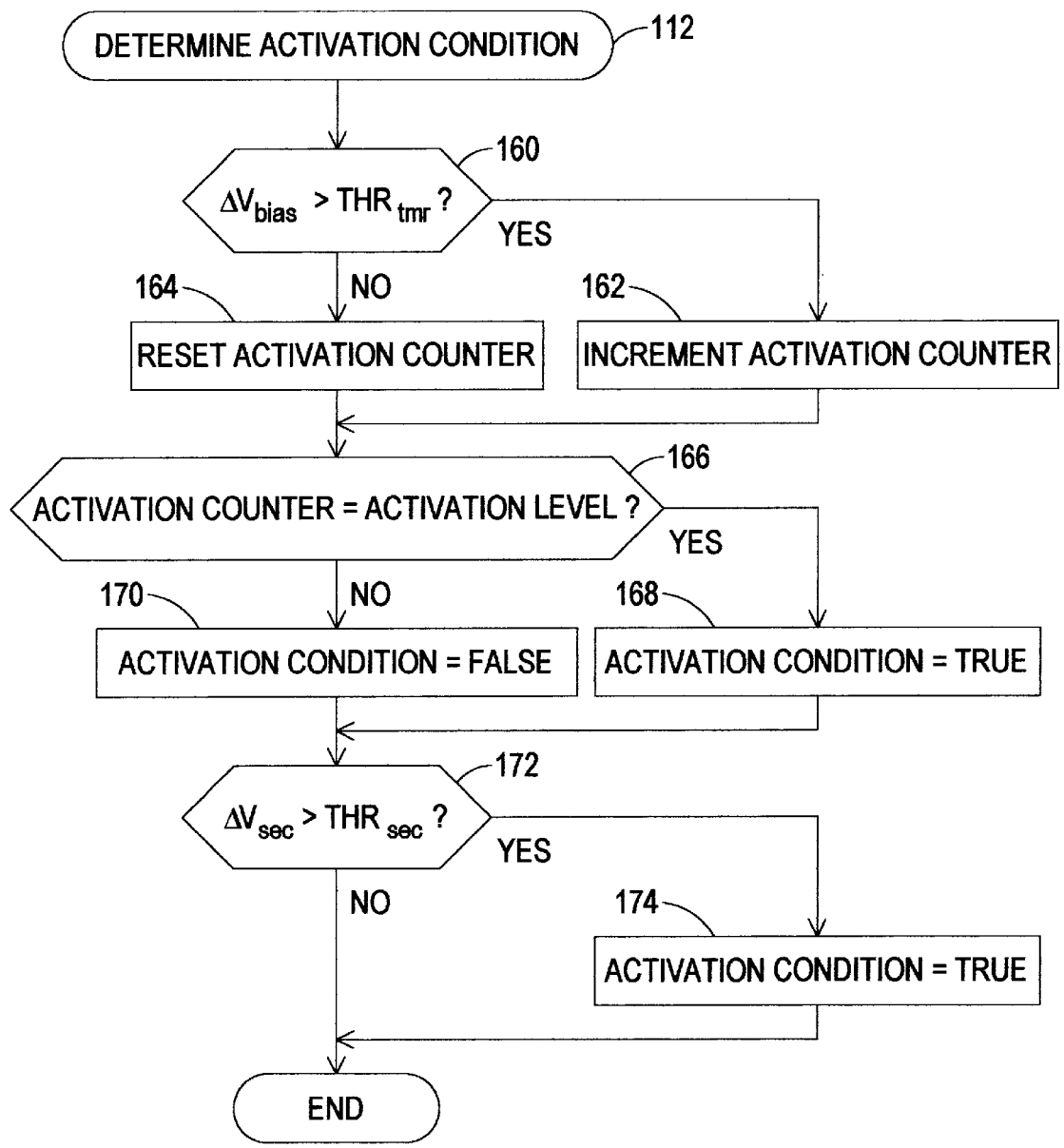

While the logic diagram of FIG. 3 is a useful aid in understanding the operation of the subject control method, it will be understood that the various blocks such as comparators 18, 30 and 36 are not physically present within the microprocessor $\mu$P, and that the microprocessor $\mu$P carries out the control method by executing a computer program stored in the memory 24. FIGS. 4–6 set forth a flow diagram representative of pertinent portions of such a computer program. FIG. 4 is a main flow diagram, FIG. 5 details a step of the main flow diagram relating to calculation of threshold adjustments, and FIG. 6 details a step of the main flow diagram relating to determining when the threshold adjustments should be applied to the threshold.

Referring to FIG. 4, the block 100 designates a series of instructions executed at the initiation of vehicle operation for initializing various registers, counters, flags and variables to a pre-defined state. For example, the moving threshold $THR_{mov}$ is initialized at an initial value $THR_{init}$, and the active deployment threshold $THR_{act}$ is initialized to the fixed value $THR_{fix}$. Thereafter, the blocks 102 and 104 are executed to read the filtered output signal ACCEL of the longitudinal acceleration sensor LAS, and to compute various severity measurements, including $\Delta V$, $\Delta V_{bias}$, $\Delta V_{win}$, $V_{sec}$, and so on. Block 106 is then executed to determine a net threshold adjustment $T_A$, as described in detail below in reference to FIG. 5. Block 108 then limits the magnitude of $T_A$ to a limit value, and block 110 adds the new value of $T_A$ to the current value of $THR_{mov}$ to update the moving threshold $THR_{mov}$. Block 112 determines the activating conditions for application of the moving threshold $THR_{mov}$, and is detailed in the flow diagram of FIG. 6; in general, the activation conditions are TRUE if the threshold adjustments $T_A$ are to be applied, and FALSE if the fixed threshold $THR_{fix}$ is to be used to determine deployment. Thus, if block 114 determines that the activation conditions are TRUE, block 116 is executed to set $THR_{act}$ equal to $THR_{mov}$. Otherwise, block 118 is executed to set $THR_{act}$ equal to $THR_{fix}$. Finally, block 120 compares the windowed velocity $\Delta V_{win}$ to the active threshold $THR_{act}$. If $\Delta V_{win}$ exceeds $THR_{act}$, the block 122 is executed to deploy the restraints AB.

As indicated above, the flow diagram of FIG. 5 details the determination of the net threshold adjustment $T_A$. In the illustrated embodiment, the various event progression thresholds a–d, the regions 1–4 for each secondary measurement, and the associated threshold adjustment amounts described above in reference to FIG. 2 are stored in an adaptation matrix within microprocessor μP, and a series of progression level masks for each secondary measurement are used to identify corresponding regions and adjustments amounts $T_A$. Blocks 130–142 comprise a nested loop for determining the net threshold adaptation amount $T_A$, taking into account each of the secondary measurements. Thus, for each secondary measurement $\Delta V_{sec}$, the microprocessor μP executes the blocks 132–140 within the $\Delta V_{sec}$ loop boundary blocks 130 and 142, and for each progression level mask L, the microprocessor μP executes the blocks 134–138 within the progression level loop boundary blocks 132 and 140. At block 134, the current mask L is applied to the matrix, and the microprocessor μP determines if the biased velocity $\Delta V_{bias}$ is within the corresponding progression level thresholds. If not, the mask L for the next progression level is applied to the matrix, as indicated at block 140. If $\Delta V_{bias}$ is within the corresponding progression level thresholds, block 136 determines if the respective secondary measurement $\Delta V_{sec}$ is within an adaptation region corresponding to the progression level of the mask L, and if so, block 138 adds the corresponding adaptation value to the net threshold adaptation amount $T_A$. As indicated at block 138, the adaptation value is stored in the matrix as a function of the secondary measurement $\Delta V_{sec}$ and the progression level mask L.

After the net threshold adaptation amount $T_A$ is determined for each progression level mask L of each secondary measurement $\Delta V_{sec}$, the blocks 144–148 are executed to bias the moving threshold $THR_{mov}$ toward $THR_{init}$ if the event progression level is "a"—i.e., no activity. Block 144 determines if the event progression is at level "a". If so, block 136 compares $THR_{mov}$ to $THR_{init}$. If $THR_{mov}$ has been adjusted to a value less than $THR_{init}$, block 148 sets the net threshold adaptation amount $T_A$ to a positive incremental value, referred to in FIG. 5 as + Threshold Recover. Conversely, if $THR_{mov}$ has been adjusted to a value greater than $THR_{init}$, block 150 sets the net threshold adaptation amount $T_A$ to a negative incremental value, referred to in FIG. 5 as − Threshold Recover.

Finally, the flow diagram of FIG. 6 details the step of determining the activation condition – that is, whether the active deployment threshold $THR_{act}$ should be determined in accordance with the fixed threshold $THR_{fix}$ (activation condition=FALSE) or the moving threshold $THR_{mov}$ (activation condition=TRUE). Block 160 is first executed to determine if $\Delta V_{bias}$ is greater than the timer threshold $THR_{tmr}$. If so, block 162 is executed to increment an activation counter; otherwise, block 164 resets the counter to zero. Block 166 then determines if the count of the activation counter exceeds an activation level corresponding a predetermined delay time. If so, block 168 sets the activation condition to TRUE; otherwise, block 170 sets the activation condition to FALSE. Finally, block 172 determines if one or more selected secondary measures $\Delta V_{sec}$ exceed respective secondary threshold(s) $THR_{sec}$. If so, block 174 sets the activation condition to TRUE; otherwise, the activation condition remains at the state set by blocks 168–170.

In summary, the deployment method of this invention determines whether restraints should be deployed by providing a deployment threshold that is initially established at a predefined level, by periodically determining thresholds adjustments in the course of the crash event based on one or more secondary measures of crash severity, and by applying the determined adjustments to the deployment threshold (a) at a time determined in relation to a predefined level of crash progression, or (b) when certain secondary measures of crash severity indicate that the crash is especially severe. In this way, immunity is improved with respect to non-deployment events that cause high acceleration levels early in the progression of the sensed event, without sacrificing sensitivity to deployment events. While described in reference to the illustrated embodiment, it is expected that various modifications in addition to those suggested herein will occur to those skilled in the art. In this regard, it will be understood that this invention is not limited to the illustrated embodiment, and that deployment methods incorporating such modifications may fall within the scope of this invention, which is defined by the appended claims.

The embodiments of the invention in which an exclusive property or privilege is claimed are defined as follows:

1. In a vehicular supplemental restraint system having a sensor providing a vehicle acceleration signal, a restraint device and a controller for deploying the restraint device for vehicle occupant protection in a crash event based on a measure of crash severity determined from the acceleration signal, the improvement wherein the controller:

initializes a deployment threshold at a default level prior to the crash event;

determines an event progression signal during the crash event based on the acceleration signal;

determines at least one secondary measure of crash severity and a threshold adjustment amount based on such secondary measure;

initiates a predetermined delay period when the event progression signal reaches a predetermined threshold;

deploys the restraint device when said measure of crash severity exceeds said default level of the deployment threshold prior to an expiration of said predetermined delay period; and deploys the restraint device when said measure of crash severity exceeds an adaptive level based on said default level and said threshold adjustment amount after the predetermined delay period has expired.

2. The improvement of claim 1, wherein the controller deploys the restraint device when said measure of crash severity exceeds said adaptive level, without regard to the expiration of said predetermined delay period, if at least one of the secondary measures of crash severity is indicative of a severe collision.

3. The improvement of claim 1, wherein the controller resets said predetermined delay period when the event progression signal falls below said predetermined threshold.

4. A control method for a vehicular supplemental restraint system having a sensor providing a vehicle acceleration signal, a restraint device that can be deployed in a crash event for vehicle occupant protection, the method comprising the steps of: periodically determining a primary measure of crash severity based on the acceleration signal;

initializing a deployment threshold at a default level prior to the crash event;

determining an event progression signal during the crash event based on the acceleration signal;

determining at least one secondary measure of crash severity and a threshold adjustment amount based on such secondary measure;

initiating a timed delay period when the event progression signal reaches a predetermined threshold;

prior to an expiration of said timed delay period, deploying the restraint device when said primary measure of crash severity exceeds the default level of the deployment threshold; and following the expiration of said timed delay period, deploying the restraint device when said primary measure of crash severity exceeds an adaptive deployment threshold based on said threshold adjustment amount.

5. The control method of claim 4, including the step of:

deploying the restraint device when said primary measure of crash severity exceeds said adaptive deployment threshold, without regard to the expiration of said timed delay period, if at least one of the secondary measures of crash severity is indicative of a severe collision.

6. The control method of claim 4, including the step of resetting said timed delay period when the event progression signal falls below said predetermined threshold.

7. A control method for a vehicular supplemental restraint system having a sensor providing a vehicle acceleration signal, a restraint device that can be deployed in a crash event for vehicle occupant protection, the method comprising the steps of:

prior to the crash event, establishing a first deployment threshold corresponding to a predefined level of crash severity;

periodically during the crash event:

determining an event progression signal based on the acceleration signal, determining a primary measure of crash severity based on the acceleration signal;

determining at least one secondary measure of crash severity;

determining a second deployment threshold based on said secondary measure; and initiating a timed delay period when the event progression signal reaches a predetermined threshold;

deploying the restraint device when said primary measure of crash severity exceeds the first deployment threshold prior to an expiration of said timed delay period; and deploying the restraint device when said primary measure of crash severity exceeds said second deployment threshold following the expiration of said timed delay period.

8. The control method of claim 7, including the step of:

deploying the restraint device when said primary measure of crash severity exceeds said second deployment threshold, without regard to the expiration of said timed delay period, if at least one of the secondary measures of crash severity is indicative of a severe collision.

9. The control method of claim 7, including the step of:

resetting said timed delay period during the crash event if the event progression signal falls below said predetermined threshold.

* * * * *